Dec. 31, 1957            A. POLICH            2,818,176

VEHICLE MOUNTED MAGNET

Filed Dec. 23, 1955            2 Sheets-Sheet 1

INVENTOR.
ANTHONY POLICH
BY
Carlson, Pitzner, Hubbard & Wolfe
ATTORNEYS

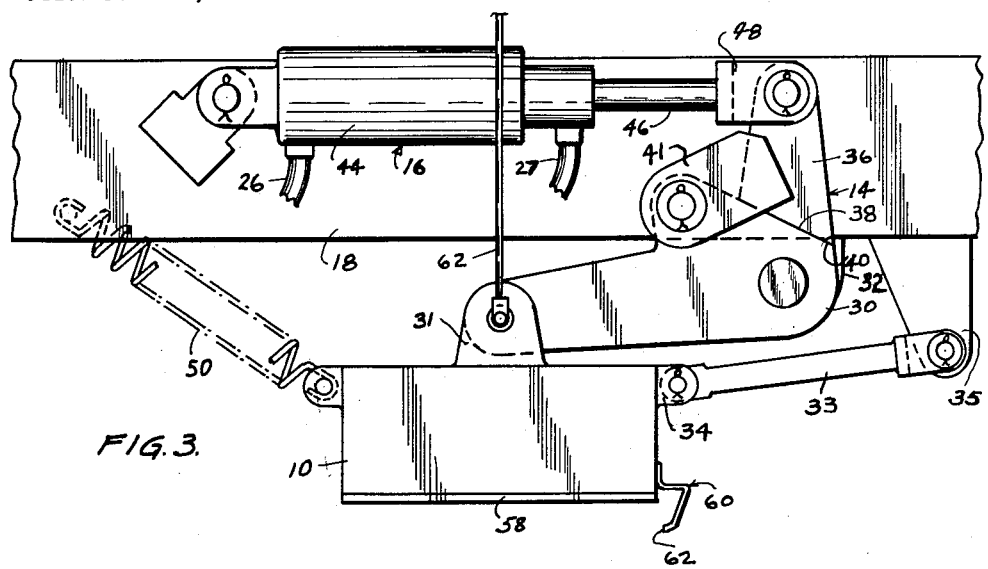
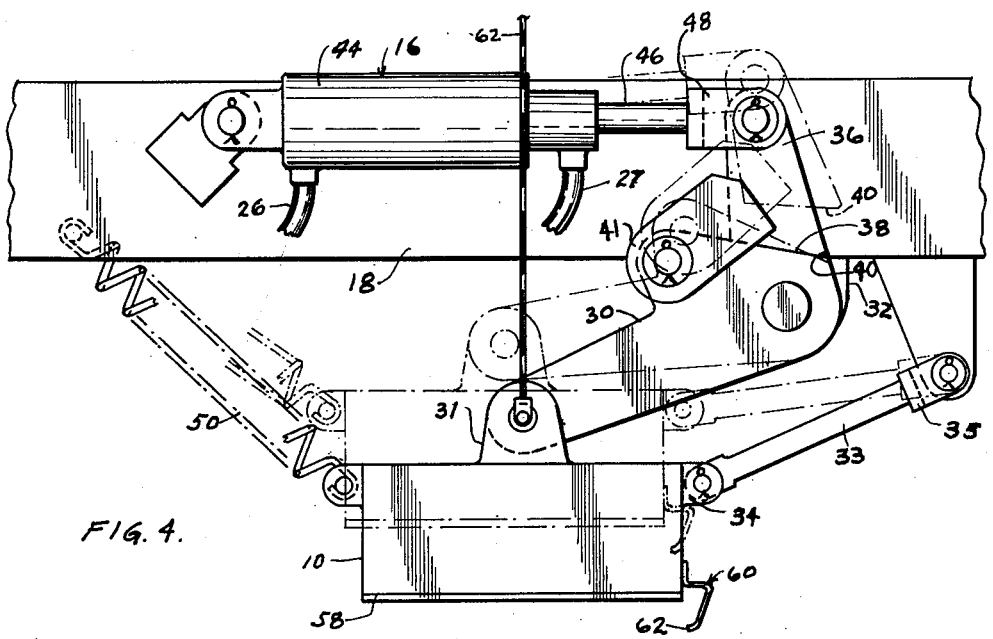

United States Patent Office 2,818,176
Patented Dec. 31, 1957

1

2,818,176
VEHICLE MOUNTED MAGNET
Anthony Polich, Brookfield, Ill., assignor to Sabre Metal Products, Inc., Lyons, Ill., a corporation of Illinois
Application December 23, 1955, Serial No. 555,074
2 Claims. (Cl. 209—215)

This invention relates to magnets for clearing magnetic debris from air fields, roads, or the like. More particularly, this invention relates to an improved device for mounting the magnet on a wheeled vehicle.

One object of the present invention is to provide a novel suspension mechanism for mounting a magnet on the chassis of a wheel vehicle which novel suspension mechanism is simple, rugged, compact and which is powerful and efficient in operation.

Another object of the present invention is to provide a magnet mounted by a novel suspension mechanism of character set forth, which mechanism is operable to lift the magnet by the application of force while leaving the magnet freely suspended so that it can be raised independently of the lifting force.

A further object of the present invention is to provide a novel suspension mechanism of the foregoing characteristics and which suspends the magnet from a vehicle chassis in a manner which insures that the magnet will remain in a constant parallel position relative to the chassis when the vehicle is passing over rough or uneven terrain.

Still another object of the present invention is to provide a novel suspension mechanism of the type set forth above and which suspends the magnet in a balanced position thereby reducing the amount of external force required to lift the same relative to the chassis.

Other objects and advantages will become apparent as the following description proceeds taken in connection with the accompanying drawings wherein:

Fig. 3 is an enlarged, fragmentary elevation view of the suspension mechanism embodying the present invention with the magnet in an elevated position.

Fig. 4 is an enlarged, fragmentary elevation view showing the magnet in its lowered operative position.

Figure 1:
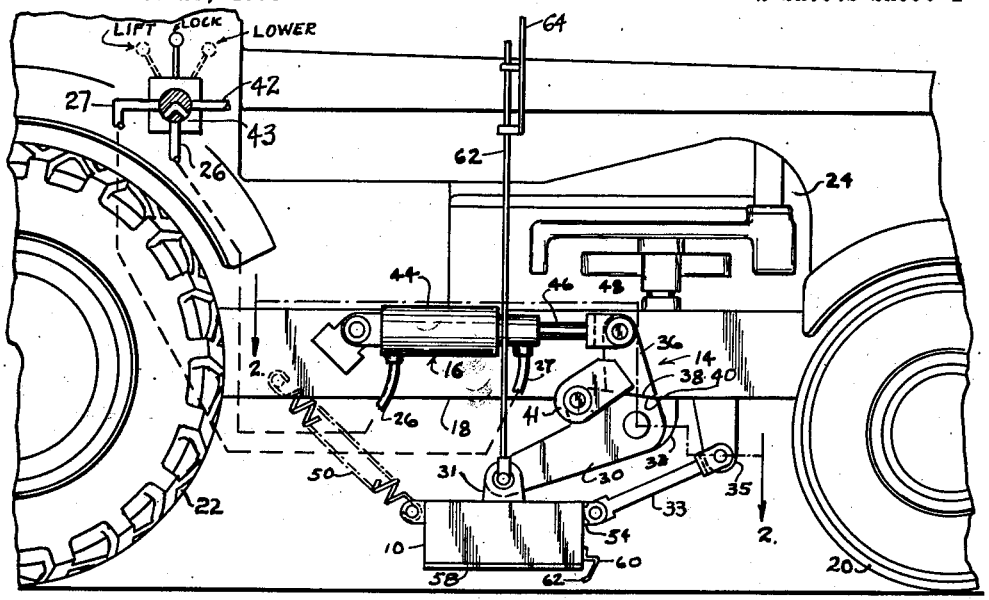
Figure 1 is a fragmentary elevation view of a tractor having a magnet mounted thereon by means of a novel suspension mechanism embodying the present invention.
Figure 2:
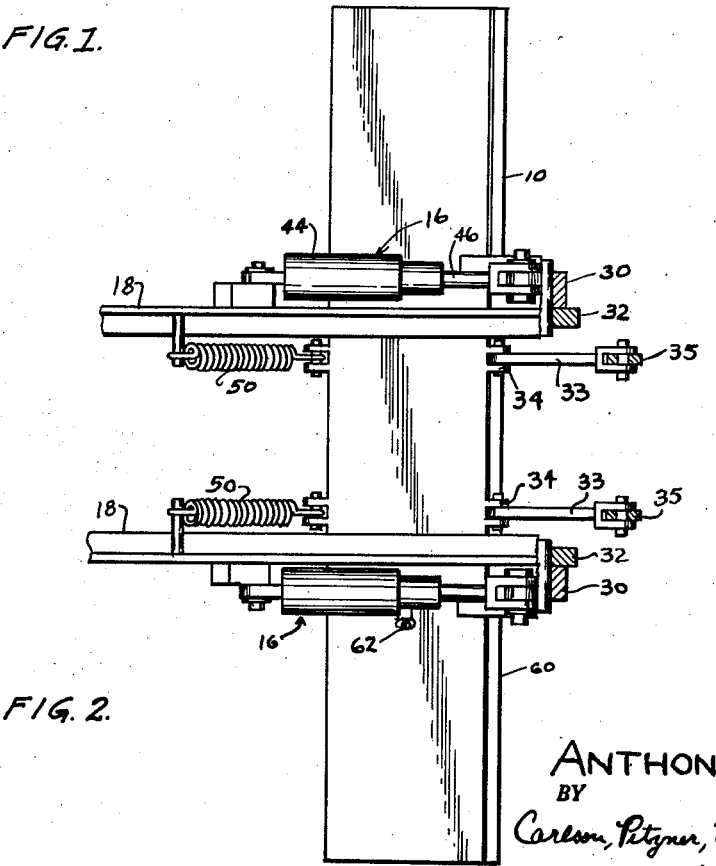
Fig. 2 is a plan view taken substantially in the plane of line 2—2 shown in Fig. 1.

While the invention is susceptible of various modifications and alternative constructions, an illustrative magnet suspension mechanism has been shown in the drawing and will be described below in detail. It should be understood, however, that there is no intention to limit the invention to the specific form disclosed, but on the contrary, the invention is to cover all modifications, alternative constructions and equivalents falling within the spirit and scope of the invention as expressed in the appended claims.

In carrying out the present invention, a magnet 10 is suspended from a wheeled vehicle at an adjustable height above the ground by a novel suspension mechanism 14 which includes a power actuator 16. Furthermore, the magnet is suspended in a manner which insures that it remains in all positions of adjustment parallel or at a preselected inclination relative to the ground over which the vehicle is passing. While the suspension mechanism and magnet are suitable for use with any type of wheeled or other movable vehicle, it will be described herein in connection with a tractor.

In the present instance, the tractor 12 comprises, among other things, a chassis 18 mounted on a pair of front wheels 20 and a pair or rear wheels 22, and a suitable engine 24 for supplying power not only to propel the vehicle but also to actuate a power take-off mechanism (not shown). This power take-off mechanism could comprise, for example, a pressure fluid pump of a type generally in use on commercial agricultural tractors. A suitable pressure fluid supply line 26 is provided for supplying pressure fluid to the suspension mechanism, and a drain 27 is provided for removing fluid leakage from the actuator.

The magnet 10 is positioned crosswise beneath the chassis 18 and is supported between the front and rear wheels for vertical movement thereon by means of a pair of the above-mentioned suspension mechanisms 14. While two such suspension mechanisms 14 are ordinarily employed so that the magnet is supported near each of its ends, only one will be described in detail herein and it will be understood that this description will apply to both of the mechanisms.

In order to suspend the magnet 10 from the chassis 18 for parallel alignment therewith, the suspension mechanism includes a power link 30 (Figs. 1 and 3) pivoted at one end between a pair of projections 31 on the magnet and at its other end to a projection 32 on the underside of the chassis 10, and a guide link 33 connected between projections 34 and 35 on the magnet and chassis respectively. The links 30 and 33 are approximately coplanar and parallel to each other, and the linear distance between the pivot projections 31 and 34 on the magnet is substantially equal to the linear distance between the pivot projections 32 and 35 on the underside of the chassis. It can thus be seen that during downward and upward movements of the magnet, the parallel links 30 and 33 will hold the magnet parallel to the chassis. The magnet accomplishes its sweeping operation when passing over a surface to be cleared of magnetic debris by attracting and holding on to such debris. It is desirable, therefore, for efficient operation, to hold the magnet's face close and parallel with the ground being cleared. This insures that the face of the magnet is equally active over substantially its entire area so that it performs an efficient debris removal operation.

The magnet is lifted by the application of the lifting force of the power actuator 16 to the power link 30. This force application is accomplished by a one way or lost-motion type of lever mechanism, one illustrative form of which is shown in the drawings.

In this embodiment, a lever 36 is hinged to the power link 30 at a point intermediate the ends thereof. The power link 30 and lever 36 are formed with corresponding surfaces 38 and 40 respectively which are alined with respect to the point at which the link is pivoted to the chassis 10. Forward movement of the lever 36 by the power actuator 16 causes an engagement of the corresponding surfaces 38 and 40 which results in a positive one-way force transmission between lever 36 and the link 30. Upon application of force by the power actuator 16 to the lever 36 it can easily be seen that the magnet will be lifted and moved upwardly relative to the chassis (Fig. 3).

The power link 30 and adjoining lever 36 are particularly well adapted to be constructed from a single piece of flat stock metal. This is accomplished by forming pieces having the shape of the two abutting portions, and then cutting them apart to form the respective abutting surfaces 38 and 40. A tab 41 is then welded to the lever 36 so that it overlaps a portion of the power link. The overlapping parts of the tab 41 and the link are then pivotally secured to each other.

An economical, easily constructed suspending assembly is thus formed. By joining the power link 30 and the lever 36 in such a manner, the magnet is suspended from the chassis by a positive one-way force transmitting linkage. This linkage enables the magnet to move upwardly independently of the power actuator lifting mechanism on the vehicle.

For purposes of exerting a force on the lever 36 to swing the link 30 and thereby raise the magnet 10, the power actuator 16 is pivotally secured on the chassis adjacent to the lever 36. In the present instance, the power actuator is shown in the form of a hydraulic piston and cylinder unit, although other forms of mechanical or electrical actuators could be used to advantage. Pressure fluid is supplied from the vehicle power take-off through a supply conduit 42 and under the control of a suitable three-way control valve 43 to the power actuator through the pressure fluid supply line 26. Similarly, the magnet is lowered by discharging pressure fluid from the cylinder through the control valve 43 to the drain conduit 27.

The cylinder 44 of the illustrative power actuator 16 is pivoted at its closed end to the chassis 10. A piston is slidably positioned in the cylinder 44 and includes a rod 46 which projects outwardly from the end of the cylinder. The rod 46 pivotally engages the upwardly extending free end of the lever 36, a yoke 48 being secured to the free end of the rod for this purpose.

The control valve 43 is mounted in the position accessible to the operator of the vehicle. When the valve is in the "lift" position, pressure fluid is supplied to the cylinder 44 on both sides of the chassis and exerts a force on the pistons in the cylinders. This force acts through the above-described linkages on each side of the chassis (Fig. 4) to lift the magnet. The magnet is held in a raised position by placing the control valve in the "lock" position. This entraps fluid in the cylinder to prevent the magnet from moving downwardly of its own weight.

In order to decrease the amount of force required to be exerted by the power actuator 42 on the lever 36 when raising the magnet 10, a suitable counterbalancing device is employed to sustain a portion of the lifting force. In the present instance, this is accomplished by the provision of a tension spring 50 attached between the magnet and the chassis and acting in a direction to relieve a portion of the downward weight of the magnet.

Means are provided to protect the leading edge of the magnet face 58 against damage caused by striking projecting objects on the surface which is being cleared of magnetic material. In the present instance, this means takes the form of a bumper or a shield 60 made of non-magnetic material and secured to the leading edge of the magnet. The bumper extends longitudinally across the front edge of the magnet and comprises a forwardly projecting portion outwardly terminating in a downwardly extending guard portion 62 projecting below the lower edge of the magnet.

In order to acheive an upwardly directed force component for lifting the magnet when it encounters such an obstruction, the guard portion 62 extends rearwardly and at an angle to the face of the magnet. An obstructive force applied to the guard portion will thus have an upward component sufficient to lift the magnet. As described above, part of the weight of the magnet is assumed by the counterbalance spring 50, thereby substantially reducing the force required to lift the magnet.

When in use, the magnet, as shown in Fig. 4, is suspended a few inches above the ground to be cleared and is energized by a suitable generator or other source of electric current (not shown). As the vehicle moves over the ground, the magnet will pick up magnetic metallic objects scattered over the area being cleared. If, on occasion, a stone should be located in the path of the vehicle and projects a greater distance than the clearance between the magnet and the ground, the magnet bumper 60 will strike the obstacle as shown in Fig. 3 and thereby cause the magnet to move upwardly. In this situation, the abutting surfaces 38, 40 in the linkage separate as shown in phantom in Fig. 4. The force of the counterbalance spring 50 is adjusted so that substantially the full weight of the magnet is counterbalanced. This, combined with the fact that the links 30, 33 are directed downwardly and thus pendulous, makes it possible for the magnet to move upwardly upon the application of only a small force to the bumper 60. When the magnet has passed over the obstacle it will move downwardly and assume its position proximate to the ground being cleared.

If, at some point in the operation, the operator desires to raise the magnet, such as would be the case when an extremely large object appears in the path, the operator applies pressure fluid to the power actuator 16 thereby causing it to exert a force on the piston rod 46 to move the lever 36 forwardly and, as a result, to raise the link 30 and the magnet 10. After clearing the obstacle, the magnet is allowed to move downwardly under its own weight in response to a reduction of fluid pressure in the power actuator 16.

Provision is made for indicating the height of the magnet above the ground. This is accomplished by the use of an indicator comprising an upwardly extending rod 62 which is secured to the upper surface of the magnet and is of sufficient length to extend upwardly to a position visible to the operator. A suitable gauge 64 is provided adjacent the uppermost end of the indicator rod. The gauge 64 is calibrated according to the height of the magnet above the ground so that the operator can easily determine the position of the magnet relative to the ground being cleared.

In keeping with the above objects, a rugged easily constructed mechanism has been described. It can be seen that the magnet is mounted on the vehicle by a novel one-way force transmitting linkage. This linkage suspends the magnet in a manner enabling the vehicle operator to adjust the height of the magnet above the ground while enabling the magnet to move upwardly upon encountering an obstacle in its path.

I claim:

1. In a magnet assembly for use with a wheeled vehicle having a frame, the combination comprising a magnet having downwardly presented pole faces and extending under the frame of the vehicle and transverse to the path of movement thereof, a power actuator pivoted to the frame, a link connecting said power actuator to said magnet, said link having two coplanar parts, one of said parts having its upper end pivoted to the vehicle frame and its lower end pivoted to the magnet, the other of said parts having its upper end pivoted to the power actuator and its lower end operatively connected to said one part for positive one-way force transmission so that force may be applied to said one part for raising the magnet while enabling the magnet to freely move rearwardly and upwardly independently of said actuator upon striking an obstruction, and a second link having its upper and lower ends pivoted to the vehicle frame and the magnet respectively at points substantially equidistant from the respective ends of said one part so that the magnet remains at a preselected inclination relative to the road surface in all positions of adjustment of said links.

2. In a suspension mechanism for adjustably mounting a magnet on the chassis of a vehicle, the combination comprising, a power actuator mounted on the chassis for vertically positioning said magnet, a power link swingably connecting the magnet to the chassis, a lever operatively connecting the power actuator to said power link, and a shoulder on said lever engageable with a corresponding shoulder on said power link for limiting the lower position of the link and the magnet and disengageable from said power link shoulder when said magnet strikes an obstruction to enable said magnet to move upwardly independently of the power actuator.

References Cited in the file of this patent

UNITED STATES PATENTS

| | | |
|---|---|---|
| 2,714,454 | Vutz | Aug. 2, 1955 |
| 2,729,331 | Norment | Jan. 3, 1956 |